United States Patent

Caponi et al.

[11] Patent Number: 5,852,700
[45] Date of Patent: Dec. 22, 1998

[54] METHOD AND DEVICE FOR THE GENERATION OF ULTRASHORT OPTICAL PULSES

[75] Inventors: Renato Caponi, Turin; Riccardo Calvani, Pino Torinese, both of Italy

[73] Assignee: CSELT - Centro Studi e Laboratori Telecommunicazioni S.p.A., Turin, Italy

[21] Appl. No.: 869,935

[22] Filed: Jun. 5, 1997

[30] Foreign Application Priority Data

Jul. 2, 1996 [IT] Italy ................................ TO96A0562

[51] Int. Cl.$^6$ ........................................................ G02B 6/02
[52] U.S. Cl. ............................ 385/123; 385/147; 372/25
[58] Field of Search ................... 385/123, 25–32, 385/147; 372/20, 25, 19

[56] References Cited

U.S. PATENT DOCUMENTS 4,972,423  11/1990  Alfano et al. ............................ 372/25
5,400,350  3/1995  Galvanauska ............................ 372/20

OTHER PUBLICATIONS

"Ultrashort Pulses from a Gain–Switched DFB Laser by Fiber Compensation of the Chirp and Thermal Tuning of the Cavity"; R. Calvani et al, Optical Fiber Technology, No. 1(1995) pp. 346–350.

Primary Examiner—Phan T. H. Palmer
Attorney, Agent, or Firm—Herbert Dubno

[57] ABSTRACT

Transform-limited ultrashort optical pulses are obtained by sending into a dispersion-shifted optical fibre pulses of such duration and intensity as to produce self-phase modulation. The pulses are also made to travel through a conventional fibre with suitable dispersion and are subjected to optical filtering, so as to compensate, for a particular peak power, the phase effect due to the chirp. Pulse peak power is selected so as to coincide with the vertex of the parabola plotting the square of the duration of the outgoing pulse versus the peak power of the incoming signal.

7 Claims, 1 Drawing Sheet

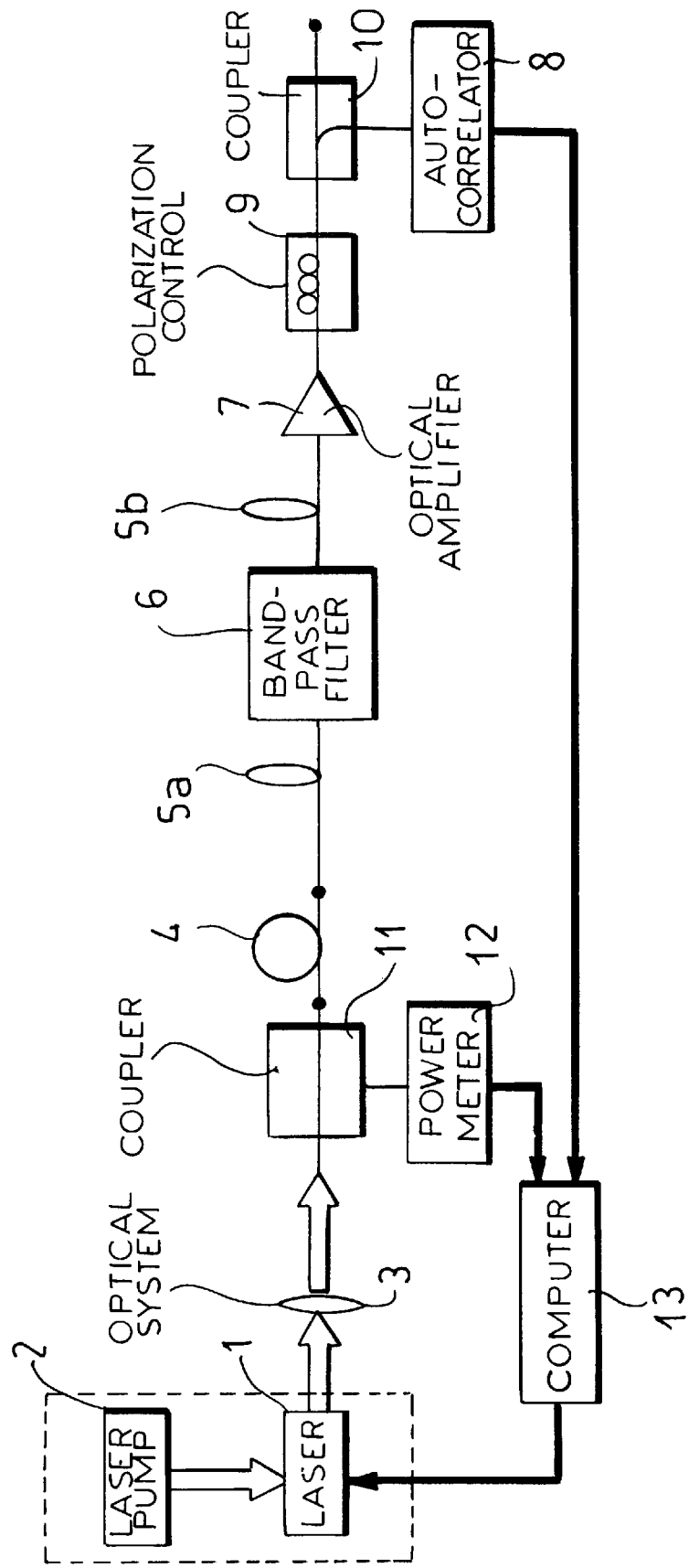

METHOD AND DEVICE FOR THE GENERATION OF ULTRASHORT OPTICAL PULSES

FIELD OF THE INVENTION

The present invention relates to optical communication and information processing systems and, more particularly, to a method of and a device for generating ultrashort optical pulses.

BACKGROUND OF THE INVENTION

Ultrashort optical pulses are used for several applications, such as high bit rate optical transmissions, measurements of saturation and recombination of charge carriers in semiconductor structures such as multiple quantum wells, etc.

With reference to the first application, optical communication systems at very high bit rate (typically 10 to 100 Gbit/s and over) are currently being studied, in which a number of channels are transmitted, each conveying information represented by a sequence of 0 and 1 pulses. The pulses of a channel are transmitted at relatively low bit rate (up to 10 Gbit/s) and the pulses relating to the other channels, transmitted at the same rate, are inserted between two successive pulses of such a channel in a predetermined sequence (Optical Time Division Multiplexing). It is evident that, to fully exploit the capacity of the transmission medium with the method described, it is desirable that the pulses be as narrow as possible in order to avoid interchannel interference and to allow the correct demultiplexing at the receiving side. Actually, at those rates, demultiplexing must be performed completely optically. Some of the techniques proposed for this purpose, which exploit the so-called Four Wave Mixing (FWM) or the Kerr effect in optical fiber (Nonlinear Optical Loop Mirror, NOLM) and are based on the overlapping between the pulse of the channel to be extracted and a pump pulse within the fiber (which acts as a non-linear medium), require that the two pulses remain overlapping as long as possible during the travel along the fiber. Furthermore the pulses must have such shape and band characteristics that the pulses themselves propagate with as little distortion as is possible. This requirement is generally expressed by saying that the pulses must be "transform limited". This expression means that the product between the duration or full width at half maximum $\Delta t$ of the pulse and the full width at half maximum $\Delta v$ of its spectrum must have a certain value, corresponding to the theoretical minimum, which depends on the pulse shape; in particular, since the pulses that are most commonly used and that have yielded the best results in transmission are Gaussian pulses and hyperbolic secant pulses, the term "transform limited" is used to indicate pulses in which the product $\Delta t \Delta v$ takes a value that corresponds to or is close to that of the Gaussian pulse or the hyperbolic secant pulse (0.441 and respectively 0.314).

For the second application mentioned above, a pump-and-probe technique is generally used. A high-power pulse is sent into the material under test to modify the characteristics of that material, while a second pulse, of an extremely short duration, is used to read the evolution through time of the characteristics, with a high resolution.

Several techniques have been proposed for generating ultrashort pulses, and in particular transform-limited pulses, and the most frequently used techniques, or those most commonly described in the literature, use the direct modulation of a semiconductor laser by means of pulses of such duration as to excite only the first peak of the laser relaxation oscillations (gain switching technique). In this condition the pulses emitted by the laser exhibit, because of the modulation, a high chirp and therefore, before being utilized, they are made to propagate in an optical fiber with such dispersion characteristics as to compensate the phase distortion produced by said chirp.

An example is described in the paper "Ultrashort Pulses from a Gain-Switched DFB Laser by Fiber Compensation of the Chirp and Thermal Tuning of the Cavity" by R. Calvani et al., Optical Fiber Technology, No. 1 (1995), pp. 346 et seq. This paper proposes a method which allows obtaining pulses at the wavelength required for subsequent multiplexing and demultiplexing (wavelength within the third transmission window) and in which a fine adjustment of the characteristics of the pulses is performed by thermally tuning the length of the laser cavity so that the pulse portions corresponding to the time of flight inside the cavity are associated with fields which interfere constructively to enhance the pulse peak and minimize the incidence of the pulse queues.

SUMMARY OF THE INVENTION

According to the invention, a method is instead provided which exploits peak power as an additional control parameter, allowing obtaining pulses whose bandwidth-duration product lies within the required limits.

The method for the generation of ultrashort optical pulses, wherein pulses, subjected to chirp and having a wavelength lying within the first band, are sent into a compensating optical fiber whose minimum dispersion lies in a second band other than the first band and whose length and dispersion characteristics are such as to compensate for a phase distortion induced by the chirp, comprises rinsing the pulses to propagate also in a dispersion-shifted optical fiber having a dispersion minimum in the first band and arranged in series with the compensating fiber. The pulses are sent into the cascade of the two fibers with such a peak power as to give rise to self-phase modulation in the dispersion-shifted fiber. The compensating fiber thus compensates the chirp due to self-phase modulation, and coincides with the vertex of the parabola representing the square of the full width at half maximum of the pulses expressed as a function of peak power. The pulses can have a wavelength lying within an anomalous dispersion region of the dispersion-shifted fiber. A calibration phase is provided to determine the peak power, the calibration phase comprising the following steps:

sending pulses of variable power into the cascade of the compensating fiber and of the dispersion-shifted fiber; measuring the full width at half maximum of a pulse for each power value; computing the square of that full width, which is an essentially parabolic function of power, with concavity upwards; and obtaining the value of power yielding the vertex of the parabola. The pulses which have propagated along the cascade of the two fibers are subjected to bandpass filtering. A device for the generation of ultrashort optical pulses, comprises a source of pulses whose wavelength lies within a first band and a compensating single mode optical fiber which is traversed by the pulses emitted by the source has minimum dispersion in a second band other than the first band and such dispersion characteristics as to compensate for the phase distortion due to a chirp of the pulses. The device also comprises a span of dispersion-shifted optical fiber which has a dispersion minimum in the first band and is arranged in series with said compensating fiber along the path of the pulses;

and means for adjusting the power of the pulses emitted by the source, in such a way that they are sent into the cascade of the two fibers with such a peak power as to give rise to self-phase modulation in the dispersion-shifted fiber and such as to coincide with the vertex of the parabola representing the square of the full width at half maximum of the pulses expressed as a function of peak power. The device can also comprise means connected to said regulating means for evaluating in a calibration phase the square of the full width at half maximum of a pulse sent into the cascade of the compensating fiber and of the dispersion-shifted fiber as the pulse power varies. The power is measured by means for measuring peak power, and the adjusting means are able to obtain the value of the peak power which minimizes said square full width, and to control the source so that it transmits pulses with said power value. The device can also comprise a bandpass filter in series with the cascade of the two fibers.

The invention exploits the Self-Phase Modulation, or SPM, generated in a dispersion-shifted optical fiber, i.e. a fiber in which the null-dispersion wavelength falls in the so-called third transmission window (1500–1550 nm), by means of pulses of appropriate duration and intensity. Self-phase modulation is a non-linear phase shift induced by a pulse on itself because of the variation of the refractive index of the fiber just due to the pulse shape and intensity. The phase spectrum of that modulation as a first approximation has a parabolic behavior. By introducing a conventional optical fiber with dispersion of the appropriate sign and with a suitable length and by varying the peak power of the above pulses, it is possible to compensate for the phase distorsion due to the chirp. This in turn allows optimization of the duration of the outgoing pulse by defining with an optical filter (tuneable and with a broad band) the region where the aforesaid compensation is to be accomplished and by obtaining the power value which corresponds to the minimum duration of the outgoing pulse from a curve (parabola), which plots the square of the duration of the outgoing pulse versus the peak power of the incoming pulse.

BRIEF DESCRIPTION OF THE DRAWING

For further clarification, reference is made to the enclosed drawing, the sole FIGURE of which schematically shows the device for performing the method according to the invention. In the drawing, thick lines indicate electrical connections and thin lines indicate optical fiber connections.

SPECIFIC DESCRIPTION

The device comprises a source of pulses of which the wavelength and the power meet certain conditions which shall be explained further on in the description. For instance the source includes a color center laser 1 (tuneable between 1450 nm and 1700 nm), associated with an Nd:YLF laser 2 (operating at 1053 nm) acting as pump radiation source. By means of an appropriate optical system schematised by lens 3, the pulses emitted by laser 1 are sent into a span of a dispersion-shifted optical fiber 4. The pulses emitted by laser 1 must have a wavelength falling within the anomalous dispersion region of the fiber (i.e. a wavelength exceeding the null-dispersion wavelength of fiber 4), so that the Kerr effect compensates for the birefringence of the fiber, and such a power as to give rise to self-phase modulation.

A coupler 11 placed upstream of fiber 4 transfers a fraction of the power associated with the pulses to a power meter 12 or a similar device measuring the peak power of the pulses. Power meter 12 is connected to a computer 13, which controls the peak power variations required by the method, as shall be seen more clearly further on, and which also receives information about the duration of the pulses outgoing from the device. Such information is provided by an autocorrelator 8 which in turn receives a fraction of the outgoing power through a further coupler 10.

A conventional optical fiber (i.e. a fiber with null dispersion in correspondence with the second transmission window, around 1300 nm, and dispersion in the order of 17 ps/nm/km for wavelengths in the third window) is also placed along the path of the pulse, said fiber having an overall length such as to compensate for the phase effect as a function of frequency and to give rise, in combination with a particular value of the peak power of the signal, to pulses which are transform-limited or at least have very short duration. The conventional fiber comprises for instance two distinct spans 5a, 5b, of which the first is directly connected to dispersion-shifted fiber 4, whereas the second provides the connection between a tuneable band-pass filter 6, connected to the output of span 5a and arranged to select a band in which the compensation is to be performed, and an optical amplifier 7 which brings output power up to the levels required by autocorrelator 8. The relative position of the compensating fiber and of the dispersion-shifted fiber, or the use of a single span of the compensating fiber instead of multiple spans, are immaterial factors for the purposes of the invention. It should be specified that optical components such as filter 6, amplifier 7 and couplers 10, 11 are equipped with fiber pigtails made of a conventional fiber, and therefore these pigtails must be taken into account in determining the overall length of the compensating fiber.

The amplified pulses are fed to utilization devices, not shown (e.g. an electro-optical modulator if the pulses are used as a transmission carrier, or the fiber of an optical demultiplexer, if the pulse is used as a pump signal for optical demultiplexing, or a multiple quantum well under test, if the source is used to measure charge carrier saturation and recombination dynamics). If necessary (e.g. when the utilization device accepts a well defined linear polarization at its input), a polarization control device 9 shall also be provided.

In an example of the invention, laser 1 emitted pulses at wavelength $\lambda=1535$ nm; fiber 4 was a 1 km long span of a fiber with null dispersion wavelength $\lambda_0=1520$ nm and with core cross sectional area of 50 $\mu m^2$; the compensating fiber had an overall length of 23 m and a coefficient $\beta_2=-2.17 \cdot 10^{-2}$ ps$^2$/m ($\beta_2$ is the coefficient of the second order term in relation $\beta(\Omega)=\beta_2\Omega^2+\beta_1\Omega+\beta_0$ expressing the chromatic dispersion of the compensating fiber, where $\Omega=\omega_p-\omega_0$, $\omega_p$ being the source frequency and $\omega_0$ being the central frequency of the spectrum). The band-pass filter 6 was centered on a wavelength of 1550 nm and its bandwidth was 5 nm.

The invention exploits the results of a theoretical analysis of the propagation of a pulse in the cascade of a dispersion-shifted fiber and a conventional fiber.

In case of negligible dispersion, absorption and Raman effect and of slowly varying pulses (hypotheses which no doubt are valid when the dispersion-shifted fiber is 1 or 2 km long), this analysis shows first of all that both the phase spectrum of a pulse undergoing self-phase modulation in the dispersion-shifted fiber and the dispersion of the pulse in the conventional fiber have, versus frequency, a complementary parabolic profile, so that the conventional fiber has a compensating action on the phase effect. Moreover, the phase effect is also a function of pulse peak power. This analysis follows the same lines as that reported in the paper by R. Calvani et al. mentioned above, with the modifications required to take into account the fact that the chirp in this application is due to the self-phase modulation, whereas in the paper it concerned the spectrum of the pulse emitted by the source.

A second aspect of interest is that, in the aforesaid conditions, the second-order central moment of the pulse (i.e. the time variance of the pulse) is itself a second order function of length Z of the compensating fiber. In that function, the coefficients of the first and second order terms are linked to the second order moment of the spectrum and the known term is linked to the second order moment of the transform-limited pulse. These considerations are also reported in the article mentioned.

In the specific case of a Gaussian pulse (this form being chosen by way of example because it allows for easier mathematical discussion), the following relation is obtained for the square of the full width at half maximum $\Delta t$ of the pulse:

$$\Delta t^2 = 4\ln 2 \left[ \left( \tau_0^2 + \frac{\beta_2^2 Z^2}{\tau_0^2} \right) + 4\beta_2 Z \gamma z P + 4 \frac{\beta_2^2 Z^2}{\tau_0^2} \gamma^2 z^2 P^2 \right]$$

where:
ln indicates the natural logarithm of the expression which follows;
z, Z are the lengths of the dispersion-shifted fiber and of the compensating fiber, respectively;
$\tau_0$ is the half-width of the pulse in correspondence with value 1/e of the amplitude;
$\beta_2$ has the meaning defined above;

$$\gamma = \frac{\omega_p n_2}{2c},$$

where $\omega_p$ has the meaning defined above and $n_2$ is the non-linear refractive index of the dispersion-shifted fiber, and P is the pulse peak power, referred to the effective area of the core section of the dispersion-shifted fiber.

The parabolic profile of $\Delta t^2$ versus the pulse peak power and the compensating fiber length is evident. Thus, for a given pulse power there will be an optimal length of the compensating fiber which minimizes the pulse duration and, vice versa, for a given length of the fiber, there will be an optimal pulse power which minimizes the pulse duration. From the operational point of view, it is clearly easier to vary power to find the optimal value of $\Delta t$, and according to the invention this operation mode was chosen. The optimal value $P_{min}$ of P and the corresponding value $\Delta t_{min}$ of $\Delta t$ are respectively $$P_{min} = -\frac{1}{2} \frac{\tau_0^2}{\beta_2 \gamma z Z} \quad [W/m^2]$$

$$\Delta t_{min} = -2 \sqrt{\ln 2} \; \frac{\beta_2 Z}{\tau_0} \quad [s]$$

as can be deduced immediately. In correspondence of $\Delta t_{min}$ there is a corresponding value $\Delta v_{min}$ (whose expression can be derived by calculating the Fourier transform) and the product $\Delta t_{min} \cdot \Delta v_{min}$ is given by $$\Delta t_{min} \cdot \Delta v_{min} = \frac{2\ln 2}{\pi} \sqrt{1 + \frac{\beta_2^2 Z^2}{\tau_0^4}}$$

With the value of $\beta_2$ given above and values of $\tau_0$ of a few picoseconds, term $$\frac{\beta_2^2 Z^2}{\tau_0^4} \text{ is } \ll 1,$$

so the product is about $2\ln 2/\pi$ (about 0.44, corresponding to the duration-bandwidth product of a Gaussian pulse), so that the ultrashort pulse is also transform-limited.

Taking into account what has been stated above, according to the invention, in a calibration phase of the apparatus, pulses of variable power (measured with power meter 12) are sent into the cascade of the compensating fiber and of the dispersion-shifted fiber; for each value of the power, the full width at half maximum of the pulse is measured with autocorrelator 8 and its square is computed, said square being an essentially parabolic function of the power, with the concavity upwards; and the value of the power yielding the vertex of the parabola is obtained. This power value is the one actually used in the apparatus. In the aforesaid example of embodiment, pulses were obtained with a duration at half-maximum of about 170 fs for a peak power in the order of 22 W.

It is evident that the above description is given purely by way of example, and that variations and modifications are possible without departing from the scope of the invention.

We claim:
1. A method of generating ultrashort optical pulses, comprising the steps of:
launching optical pulses, subject to chirp and having a wavelength lying within a first band, into a compensating optical fiber whose minimum dispersion lies in a second band other than the first band and whose length and dispersion characteristics are such as to compensate for a phase distortion induced by the chirp;
propagating said pulses also in a dispersion-shifted optical fiber having a dispersion minimum in said first band and arranged in series with compensating fiber; and
sending said pulses into the series of the compensating and dispersion-shifted optical fibers with such a peak power as to give rise to self-phase modulation in the dispersion-shifted fiber so that the compensating fiber compensates chirp due to self-phase modulation, and such as to coincide with a vertex of a parabola representing a square of a full width at half maximum of the pulses expressed as a function of peak power.
2. The method defined in claim 1 wherein said pulses have a wavelength lying within an anomalous dispersion region of the dispersion-shifted fiber.
3. The method defined in claim 2, further comprising the step of effecting a calibration phase to determine said peak power, said calibration phase comprising the following steps:
sending pulses of variable power into the series of the compensating fiber and the dispersion-shifted fiber; measuring the full width at half maximum of a pulse for each power value; computing the square of said full width, which is an essentially parabolic function of power, with concavity upwards; and obtaining the value of power yielding the vertex of the parabola.
4. The method defined in claim 3 wherein the pulses which have propagated along the series of the two fibers are subjected to bandpass filtering.

5. A device for the generation of ultrashort optical pulses, comprising:

a source of pulses whose wavelength lies within a first band; and a compensating single mode optical fiber which is traversed by pulses emitted by the source, has minimum dispersion in a second band other than the first band and such dispersion characteristics as to compensate for the phase distortion due to a chirp of the pulses;

a span of dispersion-shifted optical fiber which has a dispersion minimum in said first band and is arranged in series with said compensating fiber along a path of the pulses; and means for adjusting power of the pulses emitted by the source, in such a way that they are sent into the series of the two fibers with such a peak power as to give rise to self-phase modulation in the dispersion-shifted fiber and such as to coincide with a vertex of the parabola representing a square of a full width at half maximum of the pulses expressed as a function of peak power.

6. The device defined in claim 5, further comprising means connected to said regulating means for evaluating in a calibration phase, the square of the full width at half maximum of a pulse sent into the cascade of the compensating fiber and of the dispersion-shifted fiber as the pulse power varies, said power being measured by means for measuring peak power, and the adjusting means being able to obtain the value of the peak power which minimizes said square full width, and to control the source so that the source transmits pulses with said power value.

7. The device defined in claim 5, further comprising a band-pass filter in series with the series of the two fibers.

* * * * *